United States Patent [19]

Hirabayashi et al.

[11] Patent Number: 5,408,227
[45] Date of Patent: Apr. 18, 1995

[54] MULTIPLEX TRANSMISSION SYSTEM FOR VEHICLE

[75] Inventors: Yuuzi Hirabayashi, Higashiura, Japan; Kenji Kobayashi, Cheshire, United Kingdom; Toshiaki Isobe, Nagoya; Shigeru Uehara, Toyoda, both of Japan

[73] Assignee: Nippondenso Co., Ltd., Kariya, Japan

[21] Appl. No.: 258,591

[22] Filed: Jun. 10, 1994

Related U.S. Application Data

[63] Continuation of Ser. No. 109,461, Aug. 20, 1993, abandoned, which is a continuation of Ser. No. 701,168, May 17, 1991, abandoned.

[30] Foreign Application Priority Data

May 21, 1990 [JP] Japan ................ 2-130527
May 21, 1990 [JP] Japan ................ 2-130529

[51] Int. Cl.⁶ ............................................. H04Q 1/00
[52] U.S. Cl. ........................ 340/825.06; 340/825.50; 370/85.1
[58] Field of Search ............... 340/825.06, 825.50; 307/9.1, 10.1; 370/85.1, 85.7

[56] References Cited

U.S. PATENT DOCUMENTS

| | | | |
|---|---|---|---|
| 4,897,834 | 1/1990 | Peterson | 370/85.1 |
| 4,907,222 | 3/1990 | Slavik | 370/85.7 |
| 4,907,223 | 3/1990 | Wroblewski | 370/85.7 |
| 4,908,822 | 3/1990 | Wrobleski | 370/85.1 |
| 4,942,571 | 7/1990 | Möller et al. | 307/10.1 |

FOREIGN PATENT DOCUMENTS 1-54221  11/1989  Japan .
2-27171   6/1990  Japan .

Primary Examiner—Donald J. Yusko
Assistant Examiner—Brian Zimmerman
Attorney, Agent, or Firm—Cushman, Darby & Cushman

[57] ABSTRACT

A multiplex transmission system for a vehicle is constructed such that signals are given and received via a communication line between a plurality of peripheral stations and a central station. The plurality of peripheral stations are arranged at various places such as a door system, an engine system and the like. Each of the peripheral stations is constructed such that an input signal from the plurality of working members (a door lock, a power window and the like) is sent to the central station via the communication line. A control signal from the central station is input via the communication line 5 by the peripheral stations to output to the plurality of working members. Depending on the bit unit form of the control signal working members are actuated. The central station processes data sent by the peripheral stations to generate the control signal.

23 Claims, 8 Drawing Sheets

FIG. 4

| SOM | ID TO BE SENT TO | ID TO BE SENT FROM | DATA 1 | ... | DATA N | CRC | EOM |

FIG. 5A

| SOM | MASTER NODE ECU10·ID | COLUMN NODE ECU12·ID | 0 | 1 | 0 | ... | CRC | EOM |

FIG. 5B

| SOM | FRONT NODE ECU11·ID | MASTER NODE ECU10·ID | 0 | 0 | 0 | 0 | 1 | ... | CRC | EOM |

FIG. 5C

| SOM | MASTER NODE ECU10·ID | FRONT NODE ECU11·ID | 1 | 0 | 0 | 0 | 0 | ... | CRC | EOM |

FIG. 5D

| SOM | METER NODE ECU13·ID | MASTER NODE ECU10·ID | 0 | 1 | ... | CRC | EOM |

MULTIPLEX TRANSMISSION SYSTEM FOR VEHICLE

This is a continuation of application No. 08/109,461, filed on Aug. 20, 1993 which was abandoned upon the filing hereof; which was a continuation of 07/701,168 filed May 17, 1991, now abandoned.

BACKGROUND OF THE INVENTION

1. Field of the Invention.

The present invention relates to a multiplex transmission system, which is used for a communication system such as LAN (Local Area Network).

2. Description of the Prior Art

Conventionally, for example, in a multiplex transmission system for a vehicle, processing units having the same communication processing capacity are used at each station (nodes) connected with a door system (a door lock installed at a door and the like), and an engine system and the like, thereby communication has been realized.

However, in the above mentioned conventional system, there are stations which only perform input of a signal or control of an actuator, and a station which also performs control of other systems and the like. The required communication processing capacity differs depending on a system.

Nevertheless, each station of the system uses a processing unit having the same communication processing capacity. This causes an extremely bad efficiency problem.

Namely, judgment for operating vehicle functions such as door locking and the like on the basis of an input signal is entrusted to a station (a central station) specialized in judgment processing. Peripheral stations receiving output data which includes a judgment result must be provided with functions for rearranging the output data and performing data conversion in order to provide an output form suitable for the peripheral station. Processing units having the same communication processing capacity are used for both the central station and peripheral stations in spite of the different output form conversion to be required. Therefore, there is an extremely bad efficiency problem.

SUMMARY OF THE INVENTION

Thus in the present invention, it is an object that the peripheral stations are constructed without providing the judgment processing unit and the information converting unit as described above, and each peripheral station carries only a communication processing unit suitable for a role of each of them plays, thereby making the peripheral stations compact and simple.

The peripheral stations are constructed such that an input signal from a plurality of working members is sent by a bit unit as such so as to output to the plurality of working members in a bit unit form with respect to a control signal from the central. The central station judges and processes a sending signal from the plurality of peripheral stations to perform data conversion to send it to the peripheral stations as a control signal.

BRIEF DESCRIPTION OF THE DRAWINGS

FIG. 4 is a figure showing a message format performed by a CPU and a communication IC;

FIG. 5A to FIG. 5D show information message signals and control message signals;

DETAILED DESCRIPTION OF THE PREFERRED EMBODIMENTS

Figure 1:
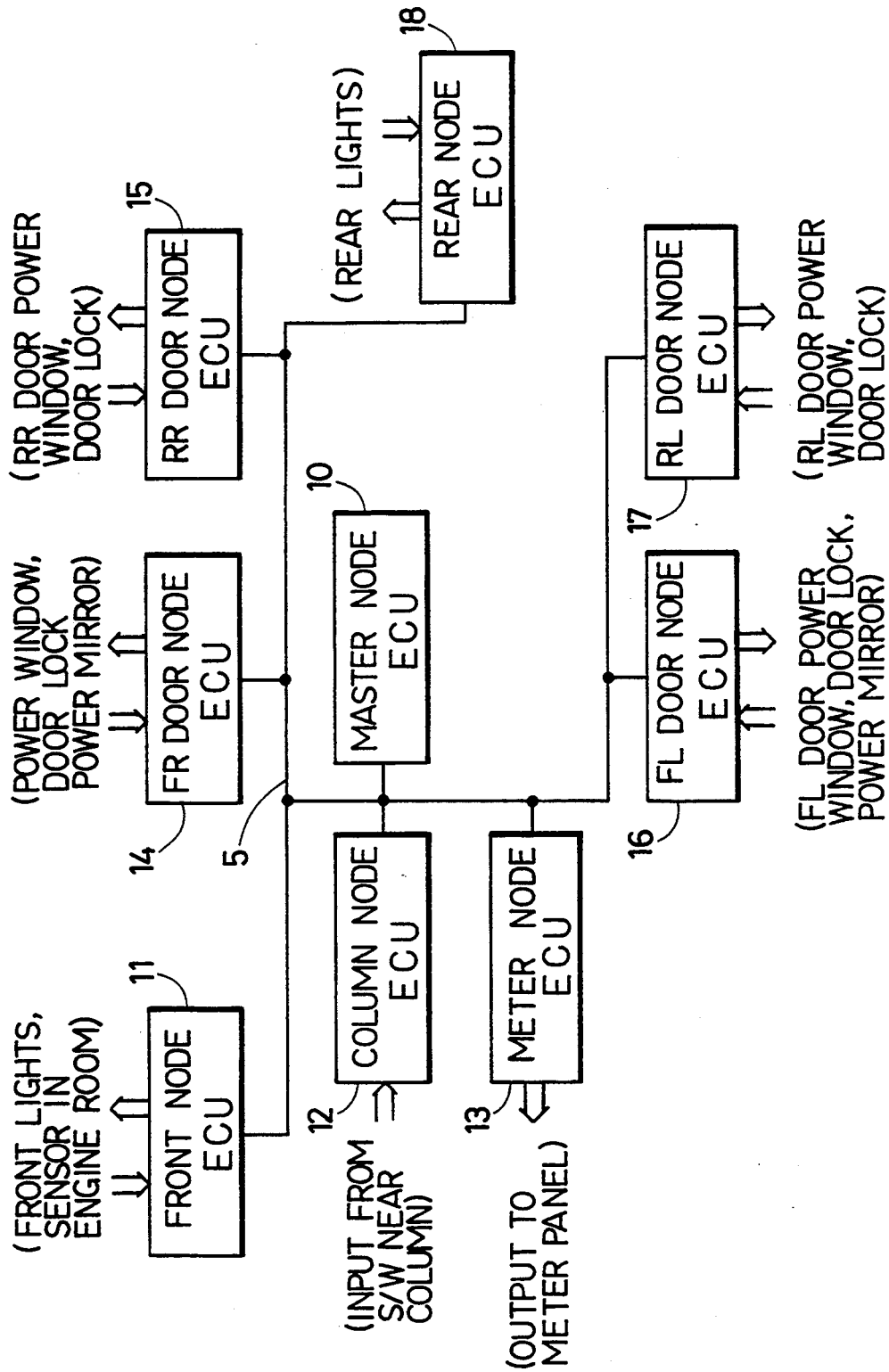
FIG. 1 is a block diagram showing an embodiment of the present invention.

FIG. 1 is a block diagram showing an embodiment of the present invention. In FIG. 1, electronic control units (hereinafter referred to as the ECU) 10 to 18 are connected with a communication line 5 and an input-/output buffer (not shown) is connected with each ECU respectively. Hence, only an input buffer is connected with the column node ECU 12 and only an output buffer is connected with the meter node ECU 13.

And the master node ECU 10 forms a central station and the ECU's 11 to 18 form peripheral stations.

The front node ECU 11 is connected with the front lights and sensors in an engine room (a shift position sensor, an oil pressure sensor and the like). The ECU 11 outputs an information signal (hereinafter referred to as the information message signal) from the front lights and the sensors in the engine room to the master node ECU 10, and accepts a control signal output from the master node ECU 10 (hereinafter referred to as the control message signal) to operate the front lights and engine.

The column node ECU 12 is connected with switches near the steering column (a head lamp switch, a clearance lamp switch and the like), and outputs information of the switches to the master node ECU 10 via the communication line 5.

The meter node ECU 13 is connected with warning lamps on a meter panel and the like, and accepts a control message signal outputted from the master node ECU 10 via the communication line 5 to operate the warning lamps.

The FR (front right) door node ECU 14 is connected with an FR door power window, a door lock, and a power mirror. The ECU 14 outputs an information message signal from the FR door power window, the door lock, and the power mirror to the master node ECU 10, and also accepts a control message signal output from the master node ECU 10 to operate the FR door, power window, door lock, and power mirror.

The RR (rear right) door node ECU 15 is connected with an RR door power window and a door lock. The ECU 15 outputs an information message signal from the RR door power window and the door lock to the mast node ECU 10, and accepts a control message signal output from the master node ECU 10 to operate the RR power window and the door lock.

The FL (front left) door node ECU 16 and the RL (rear left) door node ECU 17 have constructions corresponding to the FR door node ECU 14 and the RR door node ECU 15, respectively.

The rear node ECU 18 is connected with rear lights. The ECU 18 outputs an information message signal from the rear lights to the master node ECU 10, and accepts a control message signal output from the master node ECU 10 to operate the rear lights.

The master node ECU 10 inputs various information from the ECU's 11 to 18. The ECU 10 performs judgment processing and outputs form conversion, as described hereinafter to form a control message signal. The ECU 10 sends the control message signal to the communication line 5 to control an applicable ECU.

Next, detailed description of the master node ECU 10 and the ECU's 11 to 18, the peripheral stations, will be explained.

Figure 2:
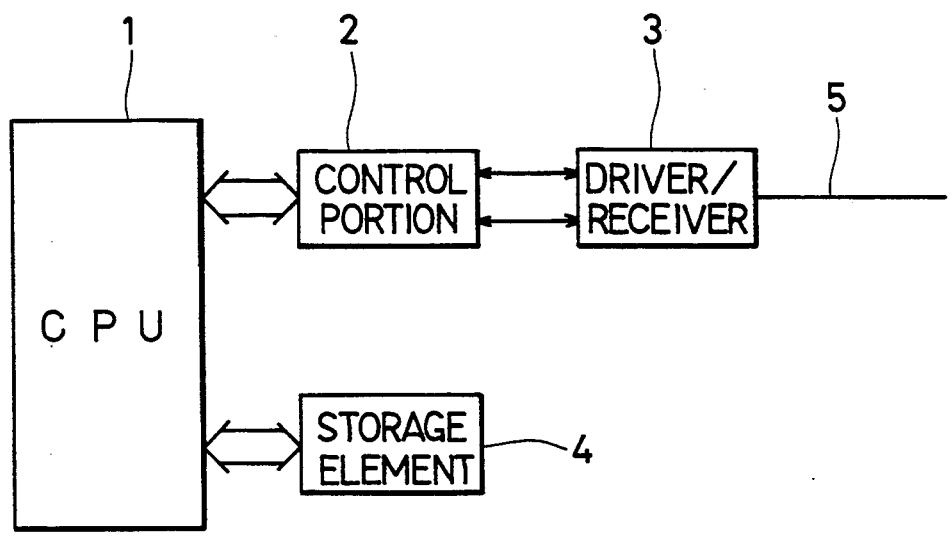
FIG. 2 is a block diagram of a master node ECU to be used for the embodiment in FIG. 1.

FIG. 2 is a black diagram showing the construction of the master node ECU 10. In FIG. 2, a driver/receiver 3 accepts an information message signal sent from the peripheral stations via the communication line 5 and outputs the information control signal to a communication control portion 2. The driver/receiver 3 also sends a control message signal output from the communication control portion 2 to the communication line 5.

The communication control portion 2 outputs input information possessed by the information message signal accepted by the communication line driver/receiver 3 (hereinafter referred to as the information communication data). Data is data formed by an input buffer 8 of the peripheral station to the CPU 1. In addition, communication control portion 2 constructs a control message signal according to control communication data output from the CPU 1 to output to the communication line driver/receiver 3.

The CPU 1 forms output information (hereinafter referred to as the control communication data) on the basis of information communication data output from the communication control portion 2. The CPU 1 outputs the control communication data to the communication control portion 2. In the process of forming the control communication data, the information communication data output from the communication control portion 2 is converted into a form within the CPU, and the judgment processing is carried out for the converted data. At this time, the judgment processing determines which data bit position of which peripheral station is turned on or off, and which data bit position of which peripheral station is made turned on or off as a result thereof. The judgment result is converted from the form within the CPU into the control communication data. At this time, a peripheral station to which the control communication data should be sent has been judged, so that the conversion (rearrangement of the data and the like) into an output form suitable for the applicable peripheral station is performed. And then, the control communication data is subjected to message format as described hereinafter (for constructing an ID to be sent to, an ID to be sent from, and control communication data) to output to the communication control portion 2. A storage element 4 stores the information communication data converted into the form within the CPU for use when the data converted into the form within the CPU 1 by the CPU 1 is subjected to processing.

Figure 3:
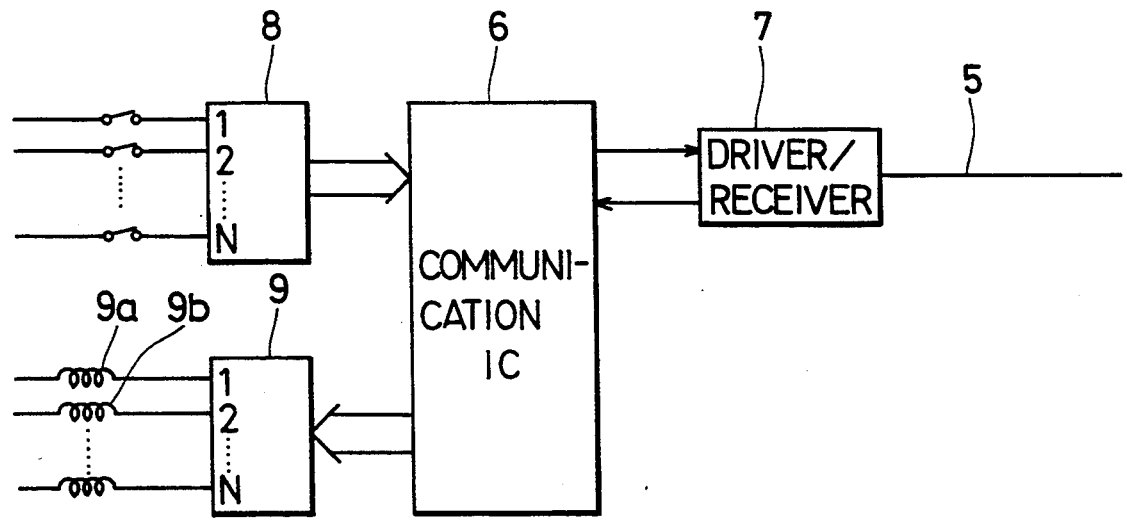
FIG. 3 is a block diagram of a peripheral station to be used for the embodiment in FIG. 1.

Next, the construction of a peripheral station as shown in FIG. 3 will be explained.

A communication line driver/receiver 7 accepts a control message signal sent from the master node ECU 10 via the communication line 5 and outputs to a communication IC 6. The driver/receiver 7 also sends an information message signal output from the communication IC 6 to the communication line 5. In the input buffer 8, information communication data is formed according to an input signal output from switches and the like connected with the peripheral station so as to output to the communication IC 6.

The communication IC 6 outputs the control communication data possessed by the control message signal accepted by the communication line driver/receiver 7 (the data output from the CPU 1 of the central station) to an output buffer 9. In addition, in order to send information communication data output from the input buffer 8 to the central station, it performs message format with respect to the information message signal to output to the communication line driver/receiver 7.

In the output buffer 9, an output signal is formed according to the control communication data output from the communication IC 6 so as to output the output signal to an actuator and the like connected with the peripheral station.

Incidentally, input and output positions of the input buffer 8 and the output buffer 9 and the data bit position of each communication data are constructed to correspond in a one to one manner. Namely, as shown in FIG. 4, in the input buffer 8, the input signal is "1" when the switch is turned on, and the input signal is "0" in the case of off, so that the information communication data is "10010 . . . ". On the other hand, in the output buffer 9, when the control communication data is "01001 . . . ", no current flows in a coil 9a, while a current flows in a coil 9b, and when a current flows, for example, in an actuator connected with the fifth data bit position of the front node ECU 11 (the actuator for driving head lamps), then the actuator is turned on to lighten the head lamps.

Next, working in the above mentioned construction will be explained.

When the input signal is received from a switch connected with the peripheral station (for example, a door lock switch in the case of the FR door node ECU 14) in the input buffer 8 of the peripheral station, the information communication data to output to the communication IC 6 is formed.

In order to send this information communication data to the master node ECU 10, the communication IC 6 performs the message format for the information message signal to output to the communication line driver/receiver 7, and the communication line driver/receiver 7 sends the information message signal to the communication line 5.

The communication line driver/receiver 3 of the master node ECU 10 accepts this information message signal sent from the peripheral station via the communication line 5 to output to the control portion 2, and the communication control portion 2 outputs the information communication data possessed by this information message signal to the CPU 1.

The CPU 1 converts this information communication data into the form within the CPU 1 and performs the judgment processing with respect to the data converted into the form within the CPU 1 stored in the storage element 4. The judgement result is converted into the control communication data from the form within the CPU 1. At this time, a peripheral station to which the control communication data should be sent has been judged, so that conversion (rearrangement of the data and the like) into the output form suitable for the applicable peripheral station is carried out. Then, this control communication data is subjected to the message format as described hereinafter to output to the communication control portion 2.

The communication control portion 2 constructs the control message signal according to the control communication data to output to the communication line driver/receiver 3, and the communication line driver/receiver 3 sends this control message signal to the communication line 5.

The communication line driver/receiver 7 of the peripheral station accepts this control message signal sent from the master node ECU 10 via the communication line 5 to output to the communication IC 6, and the communication IC 6 outputs the control communication data possessed by this control message signal to the output buffer 9.

The output buffer 9 forms the output signal according to this control communication data and outputs the output signal to the actuator and the like connected with the peripheral station to operate, for example, in the case of the FR door node ECU 14, the door lock (turn off).

The central station and the peripheral station work as described above, wherein the data bit position in the information message signal and a position of an input/output port (the input buffer 8 and the output buffer 9) of the peripheral station correspond in a one to one manner. Thus, the information communication data formed in the input buffer 8 can be exactly carried on the communication line 5 as the information message signal.

In addition, in the present example, according to the judgment processing in the CPU 1, the peripheral station to which the control communication data should be sent is judged, and the control communication data is formed by converting into the output form suitable for the applicable peripheral station (the rearrangement of the data and the like). Thus, it is unnecessary for the peripheral station to perform judgment, signal conversion and the like for this control message signal, and such a construction is possible that only the communication processing unit suitable for the role of each peripheral station is carried on.

Next, a construction content of the above mentioned message format will be explained.

FIG. 4 shows the message format. In this FIG. 4, SOM (Start Of Message) and EOM (End Of Message) represent the start and the end of each message signal. A station to which this signal is sent is designated by the ID to be sent to, and one to be sent from (a station which intends to send this signal) is designated by the ID to be sent from. Next, data 1 to N are arranged, and after the data N is a code for detecting an error CRC (Cyclic Redundancy Check); which detects whether the station which has received this signal has accepted this data correctly or not.

The message format is constructed as described above, wherein the CPU 1 forms the ID to be sent to, the ID to be sent from (that is the CPU 1), and the control communication data after performing the data conversion described above to output to the communication control portion 2. The communication control portion 2 attaches the SOM, the CRC, and the EOM after the formation to form of the control message signal so as to output to the communication line driver/receiver 3. In addition, when the communication control portion 2 outputs the information communication data to the CPU 1, the SOM, the CRC, and the EOM are eliminated from the information message signal.

On the other hand, the communication IC forms the SOM, the ID to be sent to (that is the CPU 1), the ID to be sent from (that is the communication IC 6), the input information communication data, the CRC, and the EOM as described above to output to the communication line driver/receiver 7. Namely, in the communication IC 6, the ID to be sent to and the ID to be sent from have been already established, so that it is unnecessary to perform the judgment processing done by the CPU 1. When the communication IC 6 outputs the control communication data to the output buffer 9, the SOM and the EOM are eliminated from the control message signal.

Next, working of the CPU 1 provided in the master node ECU 10 in the above mentioned construction and working of the communication IC 6 provided in the peripheral station will be explained.

At first, working of the CPU 1 will be explained on the basis of the flowcharts shown FIG. 6 to FIG. 8.

Figure 6:
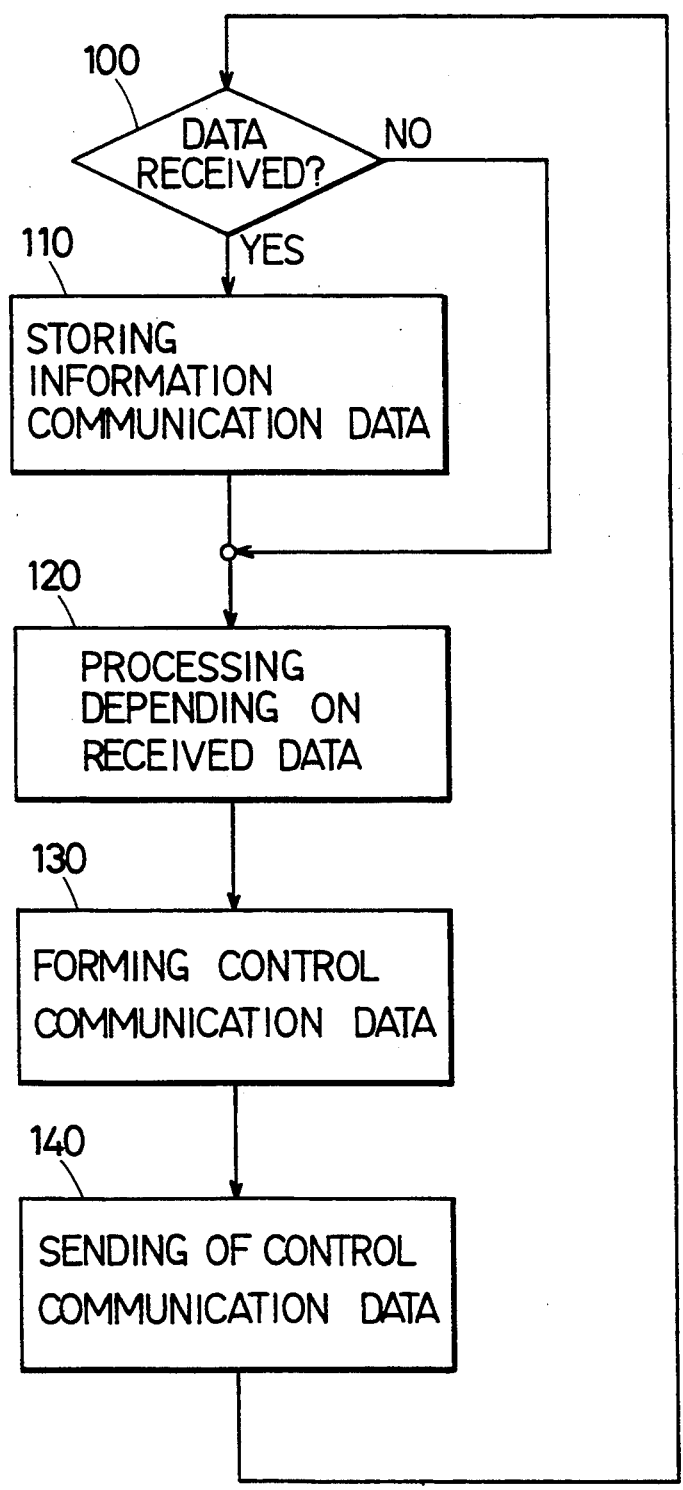
FIG. 6 to FIG. 8 are flowcharts showing the operation of the CPU.

In FIG. 6, in the step 100, it is judged whether the information communication data is received from the peripheral station or not. Namely, the communication control portion 2 receives the information message signal sent from the peripheral station and judges whether the information communication data possessed by the information message signal is output to the CPU 1 or not. And when the information communication data is received, progress to the step 110 is performed, but when the information communication data is not received, progress to the step 120 is performed.

In the step 110, this information communication data is converted into the form within the CPU, which is stored in the storage element 4 thereafter, and progress to the step 120 is performed.

In the step 120, the output control of the peripheral station of each system is judged on the basis of the information communication data stored in the storage element 4. In this judgment, for example, when a head lamp switch connected with the column node ECU 12 is turned on and the information message signal as shown in FIG. 5A is sent to the master node ECU 10, then according to the ID to be sent from and the information communication data "010 . . . ", it is judged which data bit position of which peripheral station is made turned on or off (in this case, judgment is carried out for the actuator for lighting the head lamp of the front node ECU 11 as an item). In addition, for example, when the oil pressure sensor connected with the front node ECU 11 detects an abnormal oil pressure it outputs a signal. Thus, the information message signal as shown in FIG. 5C is sent to the master node ECU 10. Then according to the ID to be sent from and the information communication data "10000 . . . ", it is judged which data bit position of which peripheral station is made turned on or off (in this case, judgment is carried out for the actuator for lighting the warning lamp of the meter node ECU 13 as an item).

In the step 130, the judged result in the step 120 is converted from the form within the CPU into the control communication data. At this time, conversion (rearrangement of the data and the like) into the output form suitable for the applicable peripheral station is performed. In this conversion, for example, when the information message signal shown in FIG. 5A as described above is sent to the master node ECU 10 (the ID to be sent from and the information communication data "010 . . . ", the actuator for lighting the head lamp of the front node ECU 11 is judged to be turned on), then as shown in FIG. 5B, the control communication data portion is converted (wherein the data bit position of the actuator for lighting the head lamp is designated as the fifth one) to form the control communication data. In addition, for example, when the information message signal shown in FIG. 5C as described above is sent to the master node ECU 10 (the ID to be sent from and the information-communication data "10000 . . . ", the actuator for lighting the warning lamp of the meter node ECU 13 is judged to be turned on), then as shown in FIG. 5D, the control communication data portion is converted (wherein the data bit position of the actuator for lighting the warning lamp is designated as the second one) to form the control communication data.

In the next step 140, the control communication data after performing the message format is output to the communication control portion 2, and the control message signal is sent to the peripheral station by means of the communication line 5 via the communication control portion 2 and the communication line driver/receiver 3. Operation then proceeds to step 100.

Next, the judgment processing which is performed in the above mentioned step 120 will be explained in detail.

Figure 7:
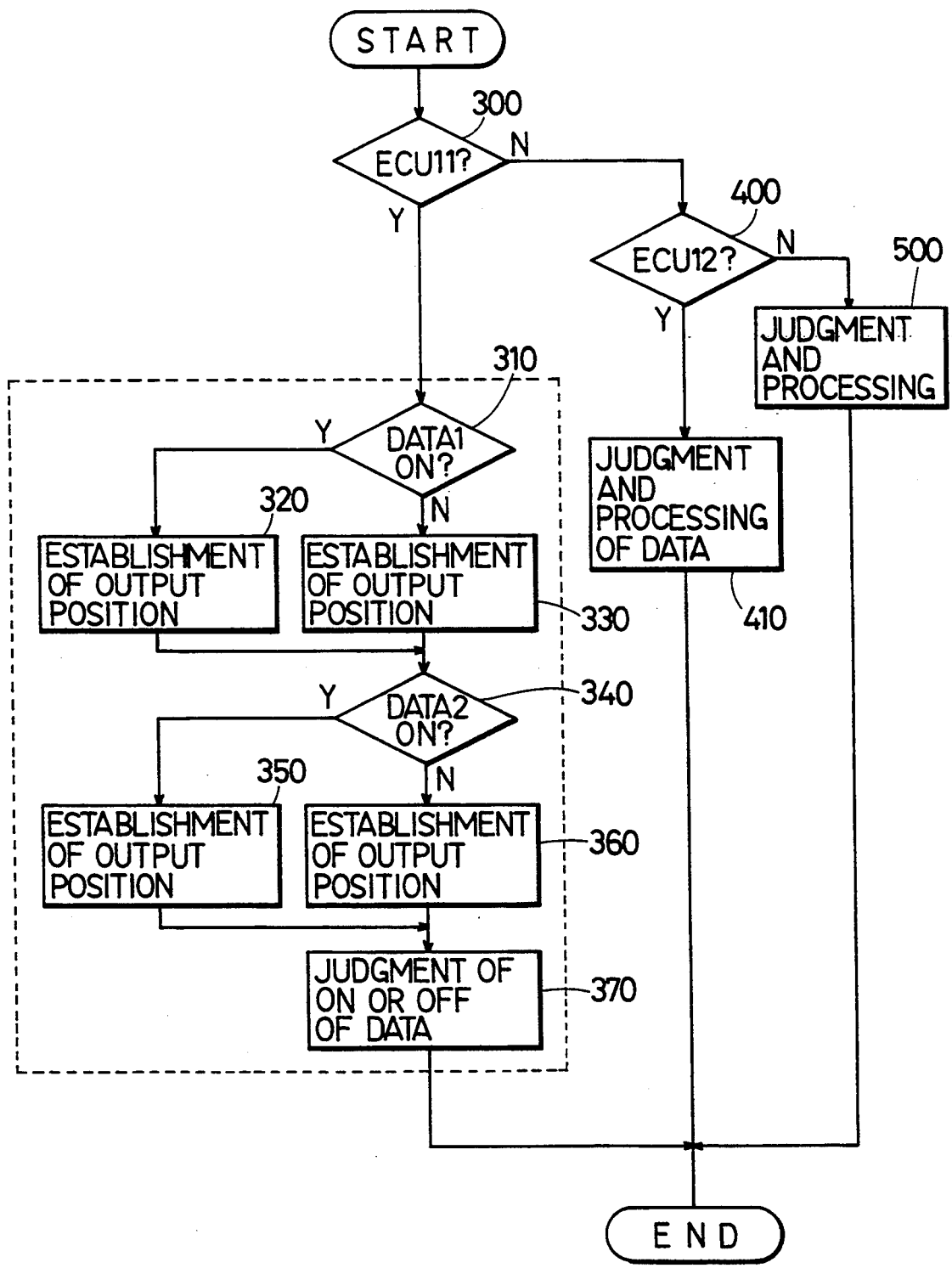

In FIG. 7, in the step 300, it is judged whether the peripheral station to be sent from is the front node ECU 11 or not. And when the one to be sent from is the ECU 11, progress to the step 310 is performed.

In the step 310, among the data 1 to N sent from the front node ECU 11, the data 1 is subjected to judgment. In this judgment, it is judged whether the data 1 is on (namely, the data 1="1") or off (namely, the data 1="0"), and when the data 1 is on, then progress to the step 320 is performed.

As a result of the judgment in the step 300 and the step 310, it has been judged which switch and the like of which peripheral station are turned on. Furthermore, actuator and the like of the peripheral station to which control communication data should be sent have been established beforehand and stored in the storage element 4. Using the judgment of steps 300 and 310 and storage element 4, the control communication data is established in step 320. For example, as described above, when the oil pressure sensor connected with the front node ECU 11 detects an abnormal oil pressure and outputs a signal, the information message signal as shown in FIG. 5C is sent to the master node ECU 10. The information communication data is "10000 . . . ", is used to establish that the actuator for lighting the warning lamp of the meter node ECU 13 should be turned on. The ID of this meter node ECU 13 and the data position of the actuator for lighting the warning lamp of the ID of the meter node ECU 13 (that is the data 2 shown in FIG. 5D) are stored in the storage element 4.

When the judgment of the step 310 is NO, step 310 is NO, step 330 is executed. According to the judgment of the step 300 and the step 310, it has been judged which switch and the like of which peripheral station are turned off. Again the actuator and the like of the peripheral station to which the control communication data should be sent have been established beforehand and are stored in the storage element 4. Thus, using the judgment of steps 300 and 310 and storage element 4, the control communication data is established in step 330.

In the same manner, in the step 340, among the data 1 to N sent from the front node ECU 11, judgement for the data 2 is performed. In this judgement, it is judged whether the data 2 is on or off. On the basis of this judgement, the same processing as those in the above mentioned steps 320 and 330 is performed in the steps 350 and 360.

In the step 370, the judgment and processing with respect to the above mentioned step 310 to the step 330 or the step 340 to step 360 are performed for the remaining data 3 to N.

In the step 400, in the same manner as the judgement performed in the step 300, it is judged that one to be sent from is the column node ECU 12 or not. And when one to be sent from is the column node ECU 12, progress to the step 410 is performed to perform the judgment and processing in the same manner as the previous steps 310 to 370.

In addition, in the step 500, the judgment and processing as done in the step 300 to the step 370 are performed for the remained ECU 14 to 18 respectively. Incidentally, no input buffer is connected with the meter node ECU 13, so that no information message signal is output from the meter node ECU 13, and the above mentioned judgment and processing are not carried out.

Next, the data conversion processing for forming the control communication data according to various information stored in the storage element 4 (corresponding to the above mentioned step 130) will be explained in detail.

Figure 8:
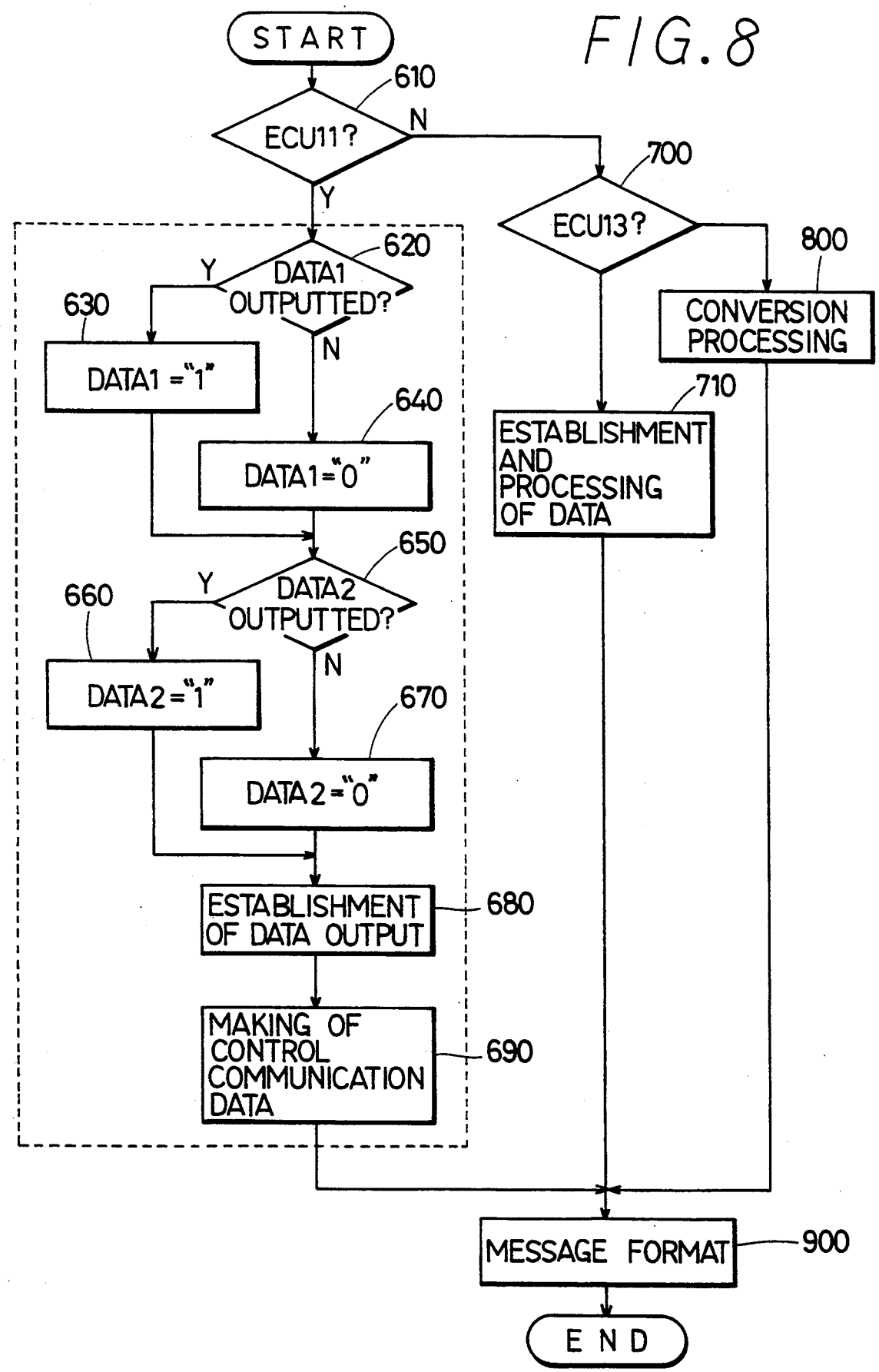

In FIG. 8, in the step 610, it is judged whether one to be sent to is the front node ECU 11 or not. And when the one to be sent to is the front node ECU 11, progress to the step 620 is performed. In step 620 it is judged whether the data 1 of the front node ECU 11 is established to be turned on or not among various information stored in the storage element 4. And when there is an establishment to be turned on, progress to the step 630 is performed to be data 1="1", but when there is no such establishment, progress to the step 640 is performed to be the data 1="0".

In the same manner, in the step 650, it is judged whether the data 2 of the front node ECU 11 is established to be turned on or not among various information stored in the storage element 4, and the same processing as the above mentioned steps 630 and 640 is performed in the steps 660 and 670.

In the step 680, the same judgment and processing as done in the steps 620 to 640 and the steps 650 to 670 are performed for the data 3 to N of the front node ECU 11.

In the step 690, the data 1 to N of the front node ECU 11 having been established according to the judgment and processing of the steps 620 to 680 are arranged as shown in FIG. 5, which are used as the control communication data to proceed to the step 900.

In the step 900, the control communication data made in the step 690 is subjected to the message format to form the control message signal.

In addition, in the step 700, it is judged whether the one to be sent to is the meter node ECU 13 or not. When the one to be sent to is the meter node ECU 13, progress to the step 710 is performed to perform data conversion as done in the steps 620 to 690. Now, when the fact that the actuator for lighting the warning lamp of the meter node ECU 13 is turned on in the previous step 320 is stored in the storage element 4, the control message signal as shown in FIG. 5D is formed. Incidentally, the data bit position of the actuator for lighting the warning lamp is designated as the second one.

In addition, in the step 800, the data conversion as done in the step 610 to the step 690 is performed for the remained ECU 14 to 18 respectively, and according to the step 900, each control communication data is subjected to the message format to form the control message signal.

Next, the operation of the communication IC 6 provided in the peripheral station will be explained.

Figure 9:
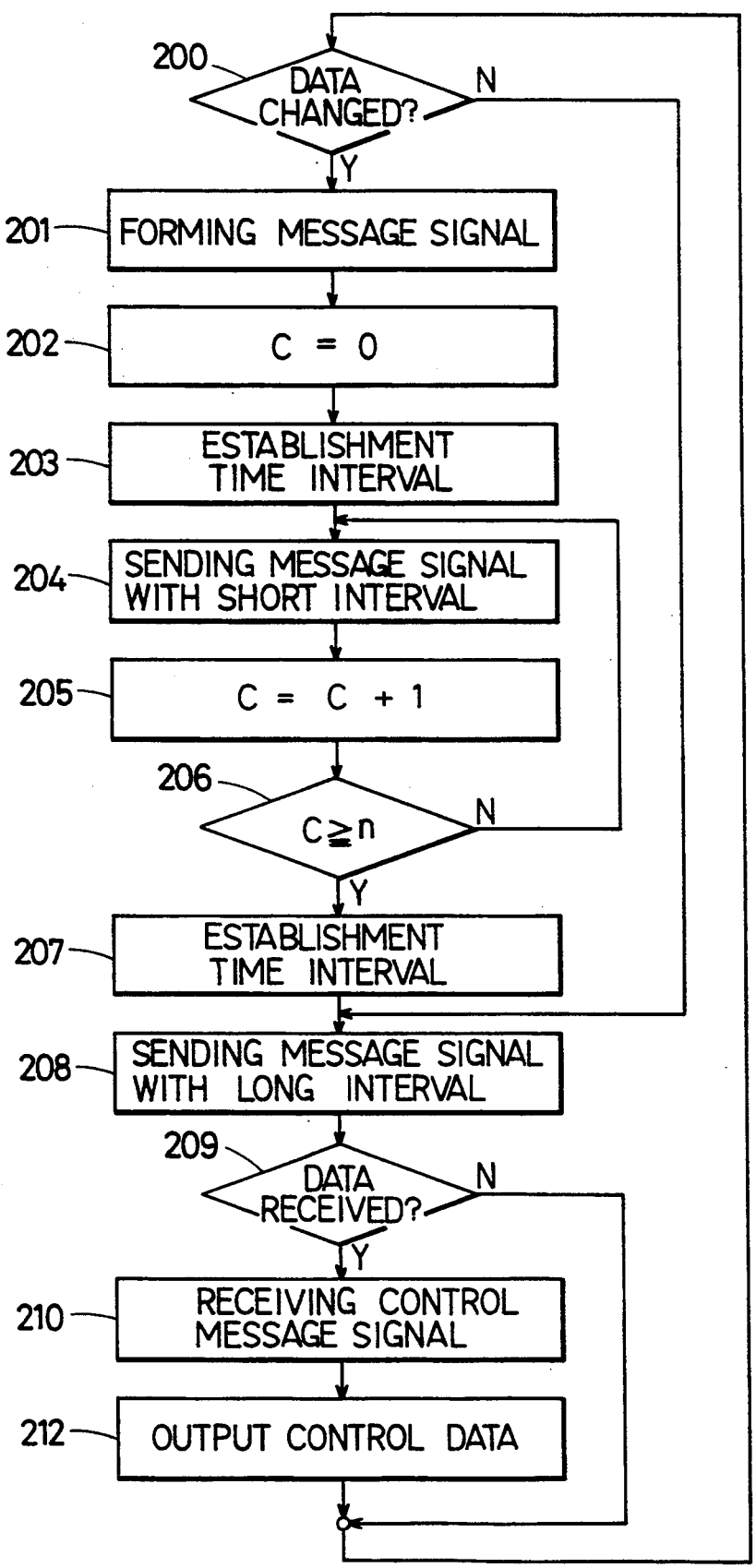
FIG. 9 is a flowchart showing the operation of the communication IC in FIG. 3.

In FIG. 9, in the step 200, it is judged whether the data from the switch and the like connected with the peripheral station (for example, the head lamp switch of the column node ECU 12) has changed or not, and when it is detected that there has been a change in the data, progress to the step 201 is performed. In the step 201, the information signal data formed by the input buffer 8 is received, and the information message signal is formed for this received information communication data by means of the above mentioned message format.

In the next step 202, a counter C is subjected to resetting to zero, and progress to the step 203 is performed to establish a time interval for sending the information message signal at a short time interval (for example, an interval of 1 second).

In the step 204, sending of the information message signal is performed at the time interval established in the step 203. This sending is carried out by sending the formed information message signal to the to the master node ECU 10 via the communication line driver/receiver 7 and the communication line 5.

In the step 205, processing for incrementing the counter C is carried out, and in the step 206, it is judged whether the counter C has reached a predetermined number of times (n) or not. When the counter C does not reach the predetermined number of times, operation returns to the step 204, and sending with the above mentioned short time interval is repeatedly performed.

In addition, when the judgment of the step 206 is YES, progress to the step 207 is performed, and a time interval for sending the information message signal at a long time interval (for example, a time interval of 5 seconds) is established.

And in the step 208, sending of the information message signal is performed with the long time interval. Until the input data changes, the above mentioned operation is repeated to perform sending of the information message signal with the long time interval.

By sending as described above, even if a communication error occurs between the central station and the peripheral stations to fail in giving and receiving the first data,, the information message signal is sent at the short time interval until the sending frequency of the information message signal reaches the predetermined number of times, so that the next data is sent immediately, and transmission of the information is certainly carried out. Moreover,the information message signal is sent at the short time interval during only a period before the sending number of times reaches the predetermined number of times, so that a throughput (a ratio of a period in which the data is present on the communication line and a period in which it is not so) is never increased.

In addition, in the step 209 shown in FIG. 9, it is judged whether the control message signal is received from the master node ECU 10 or not. And when it is judged that the control message signal has been received in the step 209, progress to the step 210 is performed, and processing for taking out the control information data from the control message signal is performed.

In the step 212, in order to output the control information data taken out in the step 210 to the actuator connected with the peripheral station, this control information data is output to the output buffer 9. This allows the control communication data to be output to the actuator via the output buffer, and the actuator works or stops in accordance with the information. Incidentally, in the master node ECU 10, the control communication data is constructed in such a form that the control communication data included in the control message signal can be directly output to the output buffer, so that in the step 212, this information communication data is directly output to the output buffer 9.

Incidentally, with respect to the communication IC 6, one for performing in a manner of software has been shown as described above, however, one in a manner of a hard logic construction may be used instead.

What is claimed is:

1. A communication system for a vehicle in which signals are given and received via a communication medium between a plurality of peripheral stations and a central station in the vehicle, said plurality of peripheral stations being positioned at various places in the vehicle,
   each of said peripheral stations comprising:
   inputting means having inputs, said inputting means for inputting at each input an input signal output from a working member,
   sending means for sending a sending signal including said input signals to said central station via said communication medium,
   input/output means having outputs, each output connected to a working member and having an output position with respect to the other outputs, said input/output means for inputting a control signal from said central station via said communication medium and directly outputting on each output an output signal included in the control signal; and
   said central station receiving said sending signals from said plurality of peripheral stations via said communication medium, generating said control signals
   wherein each of said peripheral stations receiving a control signal, receives said control signal via said communication medium, and directly outputs said output signals within said control signal on said peripheral station's corresponding outputs.

2. The communication system of claim 1, wherein each of said peripheral stations arranges said input signals within said information signal in a one-to-one arrangement corresponding to an input position of said inputs.

3. The communication system for a vehicle according to claim 1 wherein said peripheral station comprises:
   repeatedly sending means for repeatedly sending said sending signal to said central station;
   signal change detecting means for detecting a change in the input signal input with respect to said inputting means; and
   sending interval changing means for repeatedly sending said sending signal for a certain period from said repeatedly sending means at a first sending time interval responding to the change detection of the input signal by means of the signal change detecting means and repeatedly sending said sending signal from said repeatedly sending means after passing the certain time at a second predetermined time interval which is longer than said first predetermined time interval.

4. The communication system for a vehicle according to claim 1 wherein
   said plural peripheral stations are provided at each door of the vehicle to perform inputting for a switch provided at each door and perform control at the door such as door locking and the like.

5. The communication system for a vehicle according to claim 1 further comprising
a peripheral station for performing display working of a meter panel on the basis of said control signal from said central station.

6. The communication system of claim 1, wherein each of said peripheral stations arranges said input signals within said sending signal in a one-to-one arrangement corresponding to an input position of said inputs.

7. The communication system of claim 1, wherein said central station includes distinguishing means for distinguishing any one of said plurality of working members to be worked on the basis of said sending signal, and generating means for generating said control signals for each of said peripheral stations having input-/output means connected to a working member to be worked based on said distinguishing so as to work the working members to be worked.

8. A communication system for a vehicle in which signals are given and received via a communication medium between a plurality of peripheral stations and a central station in the vehicle, said plurality of peripheral stations being positioned at various places in the vehicle,
each of said peripheral stations comprising:
inputting means for inputting input signals respectively output from a plurality of said working members;
outputting means having outputs, each output connected to a working member and having an output position with respect to the other outputs, the output means for directly outputting output signals to said working members; and
means for forming an information signal from said input signals, and sending said information signal to said central station via said communication medium, and
said central station receiving said information signals from said plurality peripheral stations via said communication medium converts said converting input information of said information signals into said control signals arranging, for each control signal, said output signals within said control signal in a one-to-one arrangement corresponding to said output positions of each of said outputs of a peripheral station which is to receive said control signal, and sending said control signals to said peripheral stations via said communication medium; and
wherein each of said peripheral stations receiving a control signal from said central station receives said control signal via said communication medium, and directly outputs said output signals within said control signal to said working members via said outputting means.

9. The communication system for a vehicle according to claim 8 wherein
said plural peripheral stations are provided at each door of the vehicle to perform inputting for a switch provided at each door and perform control at the door such as door locking and the like.

10. The communication system for a vehicle according to claim 8 further comprising
a peripheral station for performing display working of a meter panel on the basis of said control signal from said central station.

11. The communication system for a vehicle according to claim 8 wherein said peripheral station comprises:
repeatedly sending means for repeatedly sending said sending signal to said central station;
signal change detecting means for detecting a change in the input signal input with respect to said inputting means; and
sending interval changing means for repeatedly sending said sending signal for a certain period from said repeatedly sending means at a first sending time interval responding to the change detection of the input signal by means of the signal change detecting means and repeatedly sending said sending signal from said repeatedly sending means after passing the certain time at a second predetermined time interval which is longer than said first predetermined time interval.

12. The communication system of claim 8, wherein said central station includes distinguishing means for distinguishing any one of said plurality of working members to be worked on the basis to input information possessed by such information signal, and generating means for generating said control signals for each of said peripheral stations having outputting means connected to a working member to be worked based on said distinguishing so as to work the working members to be worked.

13. A communication system for a vehicle in which signals are transmitted and received across a communication medium, comprising:
control station means for receiving information message signals via said communication medium, for generating control message signals based on said information message signals, and for outputting said control message signals via said communication medium, said control message signals including control signals;
a plurality of peripheral station means for receiving said control message signals, for directly outputting said control signals to working members to control said working members, for generating said information message signals based on inputs signals from at least one of said working members, and for outputting said information message signals to said control station means via said communication medium; and wherein
said control station means sends said control message signals via said communication medium to said plurality of peripheral station means.

14. The communication system of claim 13, wherein said control station means includes,
judgment means for judging from which peripheral station an information message signal was output, and outputting the judgement as a judgement result, and
data conversion means for converting an information signal included in said information message signal into an output position and generating said control signal based on said output position and said judgement result; and
each peripheral station means includes,
input means for inputting said input signals, and output means for outputting said control signals.

15. The communication system of claim 14, wherein said input means has a plurality of inputs, each input receiving an input signal; and
said output means includes an output corresponding to each bit in said control signal, and each output corresponds in a one to one manner to each input of said input means.

16. The communication system of claim 14, wherein said input means receives input signals from working members and sensors monitoring working members.

17. The communication system for a vehicle according to claim 13 wherein at least one of said peripheral station means is provided at a door of the vehicle to input an input signal from a switch provided at the door and to control locking of the door.

18. The communication system for a vehicle according to claim 13 wherein at least one peripheral station means controls a display of a meter panel based on said control signals.

19. The communication system of claim 13, wherein at least one of said peripheral station means includes:
   a plurality of inputs, each input receiving an input signal; and
   a plurality of outputs connected to an associated working member, each output corresponding to each bit in said control signal, and each output corresponding in a one to one manner to each input of said input means.

20. The communication system of claim 19, wherein at least one of said peripheral station includes:
   output means for repeatedly outputting said information message signal at a predetermined interval;
   signal change detecting means for detecting a change in said input signals; and
   output interval changing means for setting said predetermined interval to a first sending time interval for a predetermined period and setting said predetermined interval to a second sending time interval when said predetermined period expires, said second sending time interval being longer than said first sending time interval.

21. The communication system of claim 13, wherein said control station means distinguishes any one of said plurality of working members to be worked on the basis of said sending signal, and generates said control signals for each of said peripheral stations having input/output means connected to a working member to be worked based on said distinguishing so as to work the working members to be worked.

22. The communication system of claim 13, wherein said control station means includes judgement means for judging which of the working members are to be worked based on said information message signals, and said control station means generates control message signals for each of said plurality of peripheral station means controlling working members to be worked.

23. The communication system of claim 13, wherein said control station means includes judgement means for judging which of said plurality of peripheral station means to send control message signals to based on said received information message signals.

* * * * *